US008561165B2

(12) United States Patent
Kumar et al.

(10) Patent No.: US 8,561,165 B2
(45) Date of Patent: Oct. 15, 2013

(54) CENTRALIZED AUTHENTICATION FOR MULTIPLE APPLICATIONS

(75) Inventors: Nanda Kumar, Parsippany, NJ (US); Vijay G. Mudalegundi, Cumming, GA (US)

(73) Assignee: Cellco Partnership, Basking Ridge, NJ (US)

( * ) Notice: Subject to any disclaimer, the term of this patent is extended or adjusted under 35 U.S.C. 154(b) by 80 days.

(21) Appl. No.: 13/278,751

(22) Filed: Oct. 21, 2011

(65) Prior Publication Data
US 2013/0104219 A1   Apr. 25, 2013

(51) Int. Cl.
*H04L 29/06* (2006.01)
(52) U.S. Cl.
USPC .................................. 726/12; 726/5
(58) Field of Classification Search
USPC ........................................ 726/12, 5
See application file for complete search history.

(56) References Cited

U.S. PATENT DOCUMENTS

| 7,444,674 | B1 * | 10/2008 | Etique et al. | 726/12 |
| 2004/0250118 | A1 * | 12/2004 | Andreev et al. | 713/201 |
| 2010/0269170 | A1 * | 10/2010 | Chauhan et al. | 726/12 |

OTHER PUBLICATIONS

De Clercq, Jan. "Single sign-on architectures." In Infrastructure Security, pp. 40-58. Springer Berlin Heidelberg, 2002.*

* cited by examiner

*Primary Examiner* — Kambiz Zand
*Assistant Examiner* — Michael Guirguis

(57) ABSTRACT

Network applications can provide network security without containing any security code or otherwise verifying the authenticity of each request that they receive for service. Instead, a single, centralized network authentication system can be placed between the network applications and all devices requesting for services from them. The authenticity of each request for service can then be verified by the centralized network authentication system before the request is passed to the network application to which it is directed. Responses from the network applications may also be channeled back to the systems that made the requests through the centralized network authentication system.

19 Claims, 5 Drawing Sheets

CENTRALIZED AUTHENTICATION FOR MULTIPLE APPLICATIONS

DESCRIPTION OF RELATED ART

This disclosure relates to wireless mobile communication devices, network security systems, and network applications.

Authentication of requests for services that are sent over network communication systems continue to be of growing importance. This is due in part to increases in the importance of these systems and to corresponding increases in the sophistication of those that seek unauthorized access to them.

The challenges become even greater when these services are provided by enterprise applications that are intended to be accessible only to current members of the enterprise. These members now seek access to these services from wireless mobile communication devices that utilize publicly accessible network communication systems, such as cellular communication networks and the Internet. This enhances the security risks. These wireless mobile communication devices can also be lost or stolen, enhancing the security risks even further.

In addition to growing concerns over the adequacy of network security, users are being burdened with having to constantly provide security information in connection with each network application they wish to access, often having to provide increasingly complicated passwords and other security information every time particular applications are used. Network application developers are also being burdened with the corresponding need to incorporate increasingly-sophisticated security code into their network applications. Users of older network applications are also having to abandon them, even though they are providing valuable services, because they fail to provide an adequate level of network security.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Enhanced network security is provided by requiring three types of information to be authenticated: user information identifying a user, security information that the user has entered into a network data communication device, and device information identifying the network data communication device. This enhanced security is particularly useful in connection with wireless mobile communication devices that can be lost or stolen.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
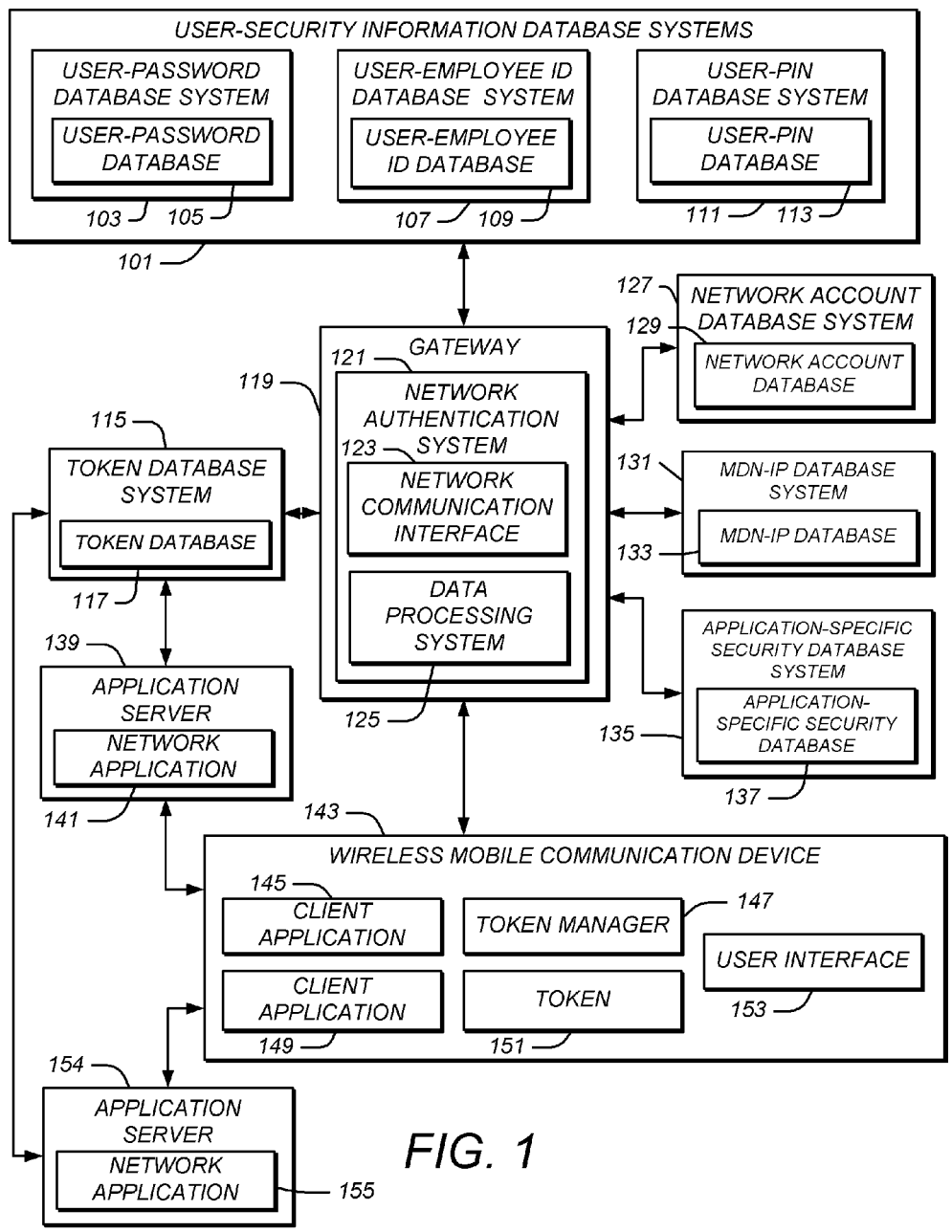
FIG. 1 illustrates an example of various network applications, a wireless mobile communication device that communicates with the various network applications, a network authentication system that authenticates the wireless mobile communication device, and related network security systems.

FIG. 1 illustrates an example of various network applications, a wireless mobile communication device 143 that communicates with the various network applications, a network authentication system 121 that authenticates the wireless mobile device, and related network security systems.

Figure 2:
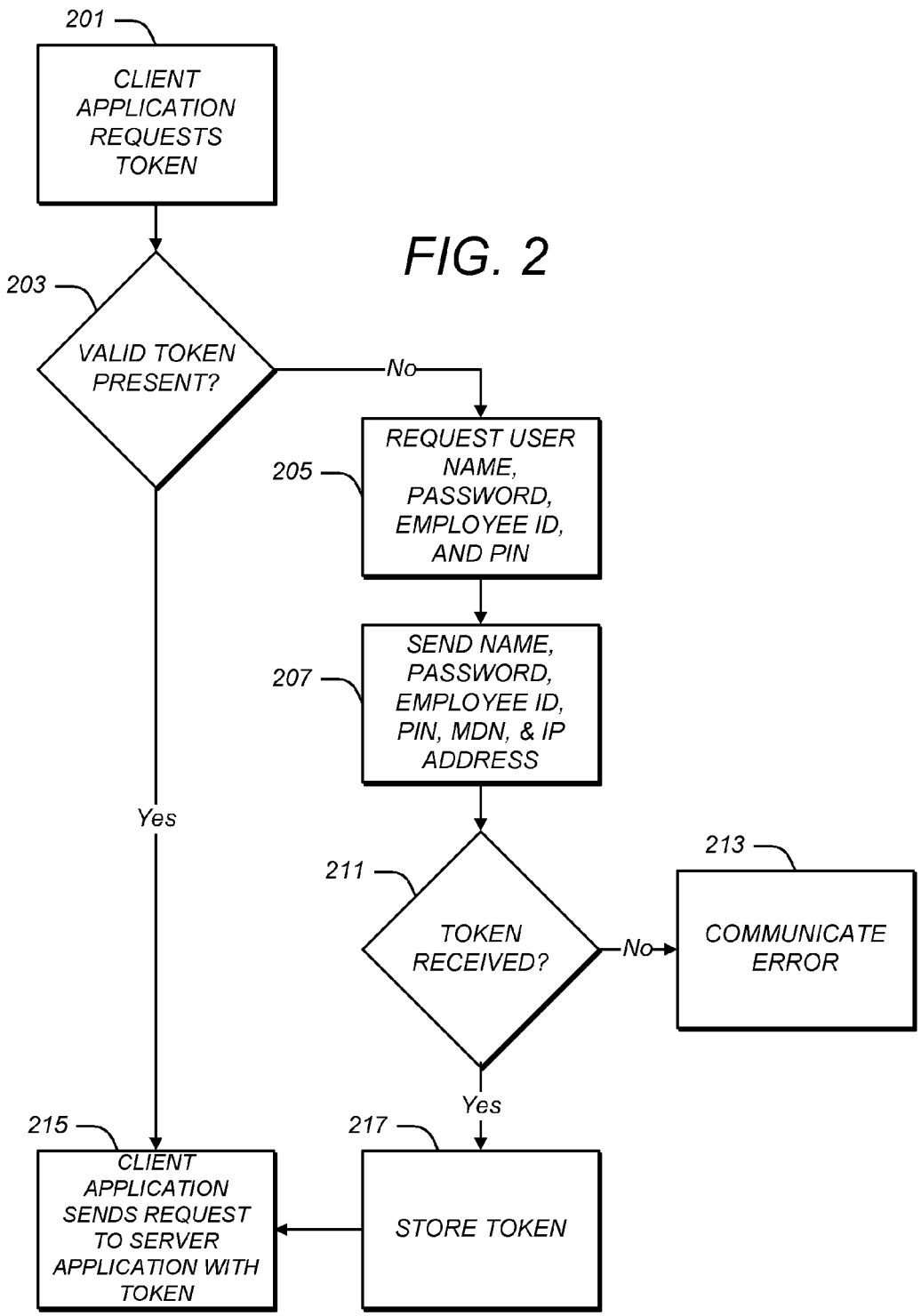
FIG. 2 illustrates an example of a process that is implemented by the wireless mobile communication device illustrated in FIG. 1.

FIG. 2 illustrates an example of a process that is implemented by the wireless mobile communication device 143 illustrated in FIG. 1. The process illustrated in FIG. 2 may be implemented by a wireless mobile communication device that is different from the one illustrated in FIG. 1. Similarly, the wireless mobile communication device 143 may implement processes different from the one illustrated in FIG. 2.

Figure 3:
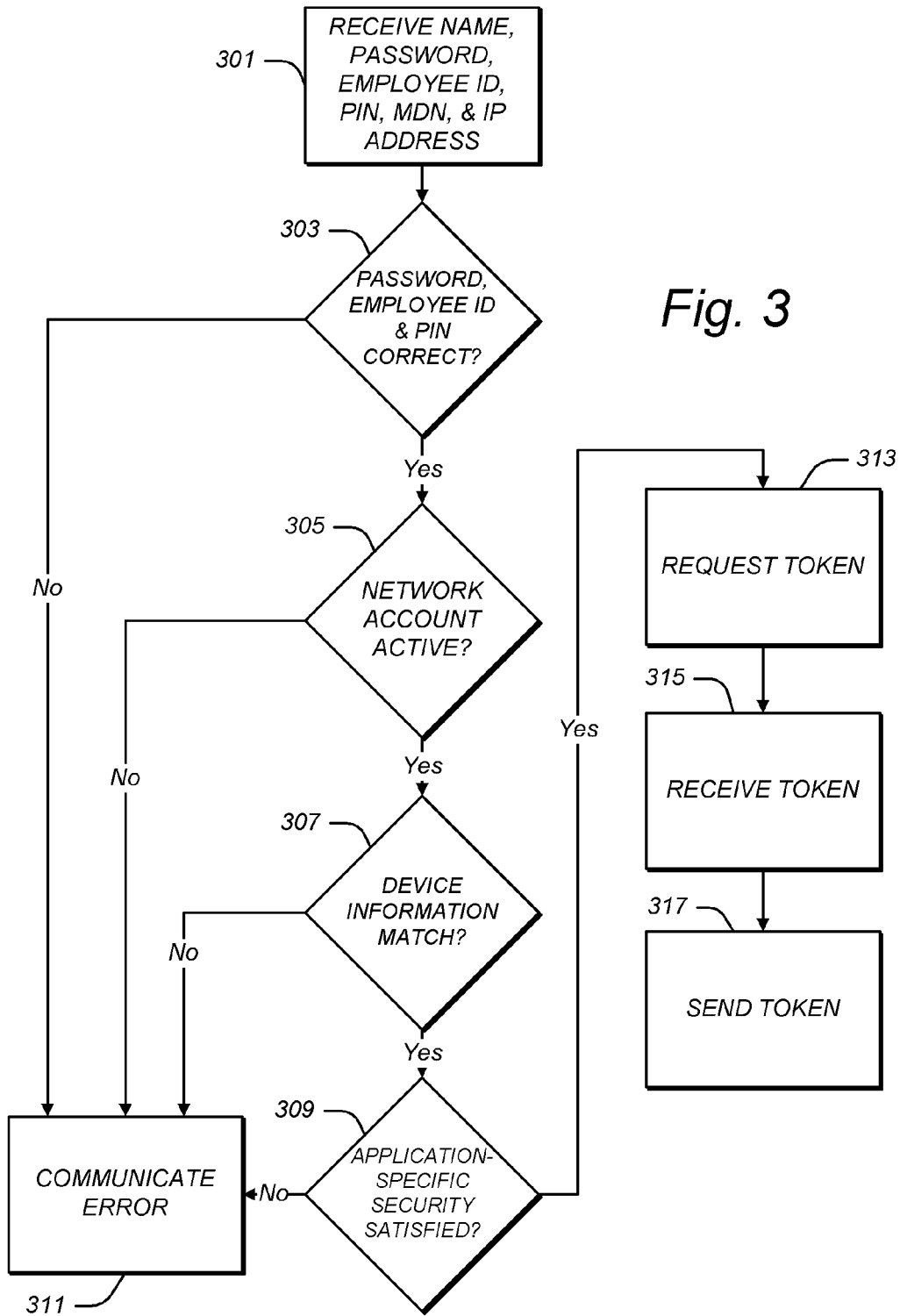
FIG. 3 illustrates an example of a process that is implemented by the network authentication system illustrated in FIG. 1.

FIG. 3 illustrates an example of a process that is implemented by the network authentication system 121 illustrated in FIG. 1. The process illustrated in FIG. 3 may be implemented by a network authentication system that is different from the one illustrated in FIG. 1. Similarly, the network authentication system 121 illustrated in FIG. 1 may implement processes different from the one illustrated in FIG. 3.

The wireless mobile communication device 143 may be of any type. For example, it may be a smart phone, laptop computer, PDA, netbook computer, or tablet computer. The wireless mobile communication device 143 is configured to wirelessly communicate data over a computer network, such as a cellular communication network, the Internet, any other type of network, or any combination of these.

The wireless mobile communication device 143 may instead be a network data communication device that is configured to communicate data over a computer network, such as a cellular communication network, the Internet, any other type of network, or any combination of these, but that may not be wireless and/or mobile. It may, for example, be a desktop computer.

A user of the wireless mobile communication device 143 may wish to obtain a service from a network application, such as a network application 141 running on an application server 139 or a network application 155 running on an application server 154.

The network applications 141 and 155 may provide network services of any type. For example, the network applications may provide human resources, financial, time entry, customer support, point of sale, and/or other type or types of services. The network applications may be enterprise applications that are intended to be accessed only by current members of an enterprise, such a business or other type of organization.

To facilitate access to these services, a corresponding client application is provided in the wireless mobile communication device 143, such as a client application 145 that is configured to request services from the network application 141 and a client application 149 that is configured to request services from the network application 155.

For security purposes, each client application 145 and 149 is configured to provide authentication information in connection with each request for service that it makes. The authentication information may be of any type. For example, the authentication information may be a session token that evidences that the wireless mobile communication device 143 was previously authenticated using a process, such as one of the processes discussed below. There may be a different session token for each application or, as in the examples below, a single session token for all of the applications.

When a user of the wireless mobile communication device 143 wishes to request a service from a network application, such as the network application 141 or 155, the user may start its corresponding client application in the wireless mobile communication device 143, such as the client application 145 or 149, respectively. In turn, the client application requests a session token from a token manager 147, as reflected by a Client Application Requests Token step 201.

The token manager 147 may be hardware and/or software that is configured to perform the functions described herein. In response to a request for a session token, the token manager 147 checks whether a valid session token is stored in the wireless mobile communication device 143, as reflected by a Valid Token Present? decision step 203. As part of this process, the token manager 147 may be configured to determine not only whether a session token is present, but whether its age is less than a pre-determined amount, such as less than five, ten, thirty, or sixty minutes. A session token may also expire upon removal of power to the wireless mobile communication device 143 and/or after there is no use of the wireless mobile communication device 143 by a user for a predetermined period, such as five, ten, thirty, or sixty minutes.

If a valid token is not present, the token manager 147 requests various pieces of security information from the user of the wireless mobile communication device 143, such as the name of the user, the user's password, the user's employee ID, and the user's employee PIN, as reflected by a Request User's Name, Password, Employee ID, and PIN step 205. In other configurations, less, more, or different security information may be requested.

A user interface 153 prompts the user for this information and receives it in response. The user interface 153 includes devices configured to communicate with the user of the wireless mobile communication device 143, such as a display (which may be a touch screen), a keyboard, a pointing device, a microphone, and/or a loud speaker. The token manager 147 may cause the user interface 153 to present one or more dialogue boxes to the user requesting this information.

The user then enters this information, The token manager 147 causes this information to be sent to a network authentication system 121, along with device information stored in the device and identifying the wireless mobile communication device 143, such as its mobile device number (MDN) and IP address, as reflected by a Send Name, Password, Employee ID, PIN, MDN, and IP Address step 207.

A network communication interface 123 within the network authentication system 121 receives this information, as reflected by a Receive Name, Password, Employee ID, PIN, MDN, and IP Address step 301. The network communication interface 123 is configured to send and receive information over a computer network, such as a cellular communication network, the Internet, another type of network, or any combination of these. The network communication interface 123 includes hardware and optionally software or firmware configured to facilitate this communication. An example of a network communication interface 123 is a network interface card (NIC).

The received information is passed to a data processing system 125. The data processing system 125 includes hardware and optionally software or firmware configured to perform the processing functions that are described herein.

The data processing system 125 checks to determine whether the received user name and password match a user name and a related password in a user-password database 105. To facilitate this, the data processing system 125 causes the network communication interface 123 to send this information to a user-security database system 101 that contains the user-password database 105.

The name and password are received by the user-password database system 103 which checks to determine whether they match a name and related password in the user-password database 105. The results of this check are sent back to the network authentication system 121, received by the network communication interface 123, and given back to the data processing system 125.

A corresponding process is employed by the data processing system 125 to determine whether the name and employee ID match a name and related employee ID in a user-employee ID database 109 managed by a user-employee ID database system 107, and whether the name and PIN match a name and related PIN in a user-PIN database 113 managed by a user-PIN database system 111. The results of the responses from the user-password database system 103, the user-employee ID database system 107, and the user-PIN database system 111 are analyzed by the data processing system 125 to determine whether the password, the employee ID, and the PIN are correct, as reflected by a Password, Employee ID, and PIN Correct? decision step 303.

The network authentication system 121 may be part of a network system, such as a cellular communication network or the Internet. The network authentication system 121 may be part of a gateway 119 configured to enable the network authentication system 121 to communicate with systems that are part of different types of networks. As indicated herein, the gateway 119 may perform authentication thereby insuring that access to enterprise applications is limited to authorized devices and personnel. The gateway 119 may authenticate an employee's identification and password. The authentication information may be compared to databases of such information, such as billing and active director databases. The various pieces of information contained in these databases may be updated by authorized personnel through appropriate interfaces, such as web-based interfaces.

As indicated above, the security information that the user enters and that is authenticated may be different from the specific types discussed above. In such a situation, the databases that are checked and their associated database systems may be different to match. In addition, and as indicated above, at least some of the security information may be simultaneously supplied to at least some of the different security systems. This overlapping security information may be the same across all of the security systems (as the employee name is in the above example) or may differ between different security systems. In an example of the latter, the employee name may be used in both the user-password database system 103 and the data processing system 125, while the employee ID may be used in the data processing system 125 and the user-PIN database system 111 (replacing the employee name in the user-PIN database system 111).

If the password, employee ID, or PIN does not match, the data processing system 125 causes an error message to be sent by the network communication interface 123 to the wireless mobile communication device 143, as reflected by a Communicate Error step 311.

If all of the security information is correct, on the other hand, the data processing system 125 checks to determine whether a network account of the user of the data communication device 143 is active, as reflected by a Network Active Account? decision step 305.

To facilitate this determination, the data processing system 125 causes the network communication interface 123 to send a query to a network account database system 127 containing a network account database 129. The query asks whether the account of the user is active. In response, the network account database system 127 checks the status of the user's account in the network account database 129 and sends an appropriate response.

The use of the word "active" embraces any type of status information that indicates that the user is authorized to request services from the network applications, such as the network applications 141 and 155. In connection with enterprise applications, for example, a user's account may be designated "active" only for so long as the user remains a member of the enterprise.

If the network account is active, the data processing system 125 determines whether the device information that it received from the wireless mobile communication device 143 matches device information that is contained in a MDN-IP database 133 operating under the management of a MDN-IP database system 131, as reflected by a Device Information Match? decision step 307. During this step, the data processing system 125 causes the network communication interface 123 to deliver the device information that was received from the wireless mobile communication device 143—its MDN and IP address in this instance—to the MDN-IP database system 131. The MDN-IP database system 131 determines whether the MDN and the IP address match an MDN and a related IP address in the MDN-IP database 133. The MDN-IP database system 131 sends the answer back to the network authentication system 121.

If the device information does not match, an error message is communicated to the wireless mobile communication device 143, as reflected by the Communicate Error step 311. Otherwise, the data processing system 125 causes the network communication interface 123 to send a request to an application-specific security database system 135 to determine whether there are any additional, application-specific security requirements that must additionally be met before authenticating the wireless mobile communication device 143.

The application-specific security database 137 contains additional security requirements for each network application, such as for the network applications 141 and 155. Recreational applications used by employees, for example, may have reduced security requirements, while business applications (such as email) may have enhanced security requirements. Such business applications, for example, may only be installed and run from company-issued devices. For some network applications, there may not be any additional requirements. Some configurations may not include this application-specific security check for any network application.

To facilitate this checking when desired, the information that is originally communicated from the wireless mobile communication device 143 to the network authentication system 121 may include an identification of the particular network application from which a service is desired. This identification information may also be sent by the network communication interface 123 to the application-specific security database system 135. In response, the application-specific security database system 135 checks to see whether there are any additional security requirements for the identified application in an application-specific security database 137. If so, these are returned to the network authentication system 121, following which the data processing system 125 determines whether they are satisfied, as reflected by an Application-Specific Security Satisfied? decision step 309. This may be accomplished, for example, by sending requests for the additional security information to the wireless mobile communication device 143 either at the time of the original authentication or later. If not, an error message is communicated to the wireless mobile communication device 143, as reflected by the Communicate Error step 311. Different error messages may be generated, dependent on from which step (303, 305, 307, 309) failure occurs, and a particular one of the error messages generated may be sent during the Communicate Error step 311 to provide enhanced feedback to the user. Alternately, a single generic error message may be generated and sent during the Communicate Error step 311 to reduce the information provided to the user for additional security.

If all of the application-specific security requirements (if any) are also satisfied, this indicates that the wireless mobile communication device 143 should be authenticated. Specifically, it indicates that the user information (i.e., a name in this example) and the security information (i.e., a password, employee ID, and PIN in this example) match user information and related security information that is managed by the user-security database system 101; that the device information (i.e., its MDN and IP address in this example) match device information in the MDN-IP database 133; and that the network account of the user is active.

If and only if all of these security checks are successfully completed, the data processing system 125 causes the network communication interface 123 to request a session token from a token database system 115, as reflected by a Request Token step 313. In response, the token database system 115 creates or obtains a token, stores it in a token database 117, and returns it to the network authentication system 121. This session token is received by the network authentication system 121, as reflected by a Received Token step 315. The data processing system 125 then causes the network communication interface 123 to send this received session token back to the wireless mobile communication device 143, as reflected by a Send Token step 317.

The response that is received from the network authentication system 121 by the wireless mobile communication device 143 is checked by the token manager 147 to determine whether it includes a session token, as reflected by the Token Received? decision step 211.

If an error message is instead received, the error message is communicated to the user, as reflected by a Communicate Error step 213. If no response is received within a predetermined period, a communication error message may be displayed advising the user to retry later and/or to contact support.

On the other hand, if a session token is received, the token manager 147 causes the session token to be stored as a token 151, as reflected by a Store Token step 217. The token manager 147 also returns the session token to the client application that requested the token, following which the client application sends a request to the network application for the desired service, together with the session token, as reflected by a Client Application Sends Request To Network Application With Token step 215.

The network application that receives the request for service and its associated token, such as the network application 141 or the network application 155, sends a request to the token database system 115 to determine whether the received token is valid. The token database system 115 checks to determine if the session token is valid. This may involve verifying the presence of the token in the token database 117. It may also involve checking the age of the token. If the age is older than a pre-determined amount, such older than five, ten, thirty or sixty minutes. If the token is in the token database and 117 and if it is not older than the pre-determined amount, the token database system 115 may conclude that the token is valid. The token database system 115 communicates the results of this check back to the network application that requested it.

If the network application receives confirmation of the validity of the token from the token database system 115, it provides the requested service. Otherwise, it sends a response back to the wireless mobile communication device 143 indicating that authentication failed.

Each time a subsequent request for a token is received by the token manager 147 from the same or a different client application, the token manager again checks to determine whether a valid token is present, as reflected by the Valid Token Present? decision step 203. If it is, the token manager 147 returns the valid token to the requesting client application. The requesting client application sends this token out to the appropriate application server, along with a request for service, as reflected by the Client Application Sends Request To Network application With Token step 215.

On the other hand, a valid token may not be present in connection with a subsequent request from a client application because the stored token has expired because, for example, one of the reasons discussed above. In this case, the session manager may again go through the process of acquiring a new session token, as illustrated in FIG. 2 and discussed above.

Figure 4:
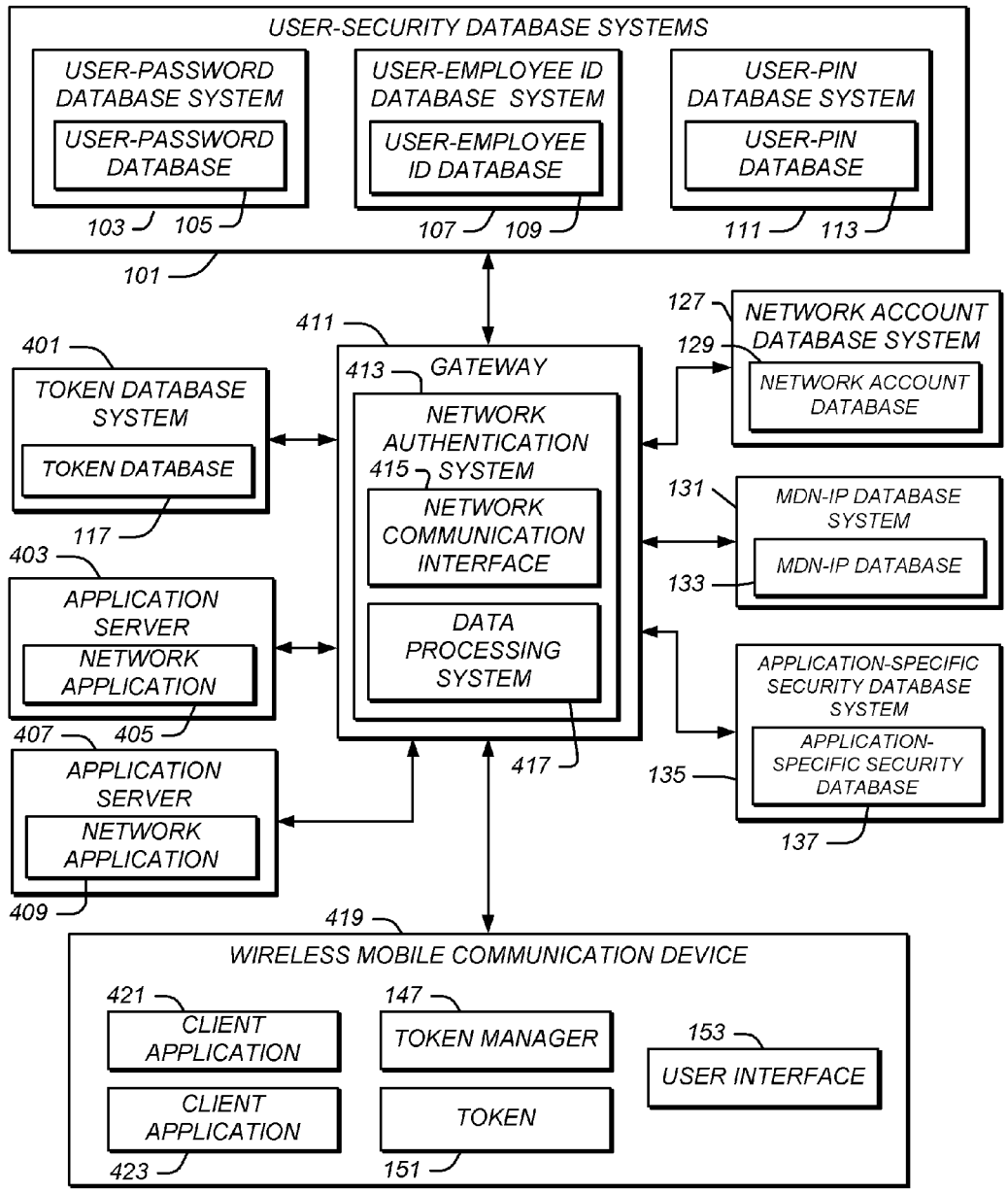
FIG. 4 illustrates the various network applications, the wireless mobile communication device that communicates with the various network applications, and the related network security systems illustrated in FIG. 1, together with an example of a network authentication system that authenticates communications from the wireless mobile communication device to the network applications.

FIG. 4 illustrates the various network applications, the wireless mobile data communication device that communicates with the various network applications, and the related network security systems illustrated in FIG. 1, together with an example of a network authentication system that authenticates communications from the wireless mobile communication device to the network applications.

The components illustrated in FIG. 4 that bear the same name and the same number as corresponding components illustrated in FIG. 1 are of the same composition and provide the same functions. For example, when a client application requests a session token from the token manager 147 and a valid token is not present, that token is provided only after the security information, device information, and network account status are verified by the processes discussed above and illustrated in FIGS. 2 and 3.

The remaining components that bear the same name but a different number are also of the same composition and provide the same functions as their corresponding component in FIG. 1, except for differences that facilitate a different routing of the requests for services. Specifically, each client application in FIG. 1 is configured to send each request for a service to the application server that is managing the network application from which the services are desired. The receiving network application then verifies the validity of the session token that is included with the request by communicating with the token database system 115.

The configuration illustrated in FIG. 4, on the other hand, routes these request for service differently. Each client application in the wireless mobile communication device 419 is configured to send each of its requests for service, including the session token, to the network authentication system 421, rather than to the application server running the target network application.

Figure 5:
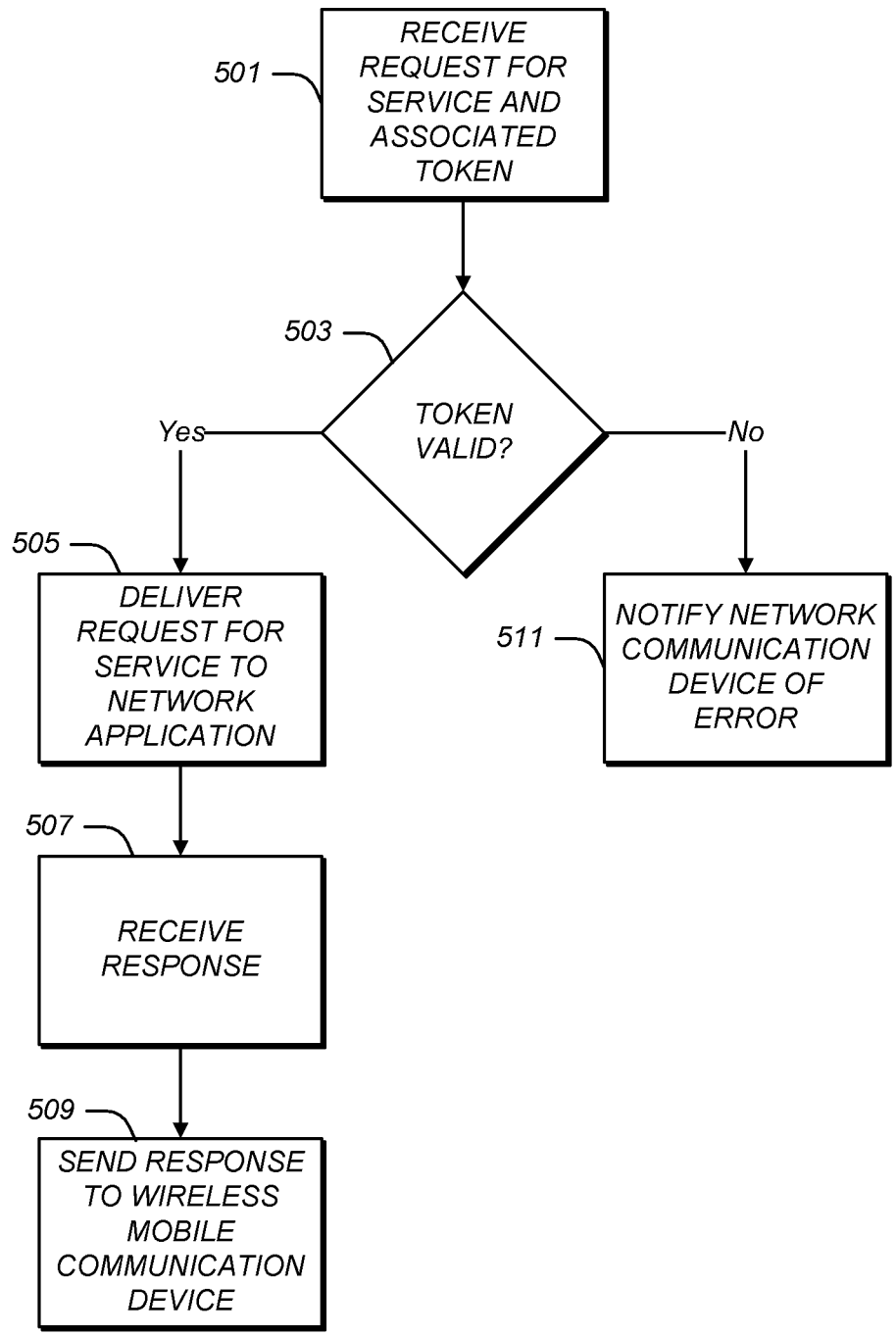
FIG. 5 illustrates a process that is implemented by the network authentication system illustrated in FIG. 4 to validate each request for service that is made by a client application in the wireless mobile communication device illustrated in FIG. 4.

FIG. 5 illustrates a process that is implemented by the network authentication system 413 illustrated in FIG. 4 to validate each request for service that is made by a client application in the wireless mobile communication device 419 illustrated in FIG. 4.

The request for service and the associated session token is received by the network communication interface 415, as reflected by a Receive Request For Service and Associated Token step 501. This information is passed to the data processing system 417 that determines whether the token is valid, as reflected by a Token Valid? decision step 503.

To make this determination, the data processing system 417 issues a request to a token database system 401 to determine whether the session token is valid. The same steps that are discussed above in connection with the validation of tokens in FIG. 1 by the token database system 115 may be followed here by the token database system 401, except that the results of the query are sent back to the network authentication system 413, rather than to the application server that is running the network application to which the request for service is directed.

If the response from the token database system 401 indicates that the token is not valid, the data processing system 425 causes the network communication interface 415 to notify the wireless mobile communication device 419 of the error, as reflected by a Notify Network Communication Device of Error step 411. On the other hand, if the response from the token database system 401 indicates that the token is valid, the data processing system 425 causes the network communication interface 415 to deliver the request for service to the target network application, such as to the application server 403 or the application server 407. The request for service need not be accompanied by the session token or any other type of authentication information. Thus, the network applications, such as the network application 405 and the network application 409, need not be configured with additional code to authenticate any of the requests for service, nor are the associated application servers 403, 407 connected in a network that can communicate with the token database system 401. Rather, that authentication function for all of the network applications is now performed by a single system, namely the network authentication system 413. The network applications and the services that they provide may nevertheless be secured by insuring that the application servers that manage the network applications, such as the applications severs 403 and 407, are part of a highly secure network that is not directly in communication with the wireless mobile communication device 419.

Any response that the network application provides to the request for service may be sent back to the network authentication system 413, as reflected by a Receive Response step 507. The data processing system 417 causes the network communication interface 415 to send this response back to the wireless mobile communication device 419, as reflected by a Send Response To Wireless Mobile Communication Device step 509. In other configurations, responses from the network applications may be sent to the wireless mobile communication device 419 directly, thus bypassing the network authentication system 413.

The communications between the various systems and devices that have been described may take place over any type of network, such as over the internet, a cellular communication network, a different type of network, or any combination of these. Some or all of the communications may or may not be encrypted for additional security. Similarly, the token 151 that is stored in the wireless mobile communication devices 143 and/or 419 may or may not be encrypted.

As illustrated in FIGS. 1 and 4, the user-password database system 103, the user-employee ID database system 107, the user-PIN database system 111, the network account database system 127, the MDN-IP database system 131, the application-specific security database system 135, and the token database system 115 are separate from the network authentication systems 121 and 413, respectively. In other configurations, one or more of these database systems may be contained within the network authentication system 121. The information in these databases may be updated to reflect needed changes by delivering the updated information to the respective database system(s) from any source or from only one or more restricted sources.

Unless otherwise indicated, the gateways, the network authentication systems, the database systems, and the application servers that have been discussed herein are each implemented with one or more computer systems configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include software (e.g., one or more operating systems, device drivers, application programs, and/or communication programs). When software is included and in connection with a software version of the token manager 147, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

Some of the various components that have been described herein may be implement using existing technology and systems. For example, the network authentication system 423 may be implemented using the hardware/software appliance from IBM called Data Power; the MDN-IP database system may be implemented by an AAA server in a cellular telephone network; the network account database systems may be implemented by a Billing System in a cellular telephone network; the user-employee ID database system and the user-PIN database system may both be implemented with an Identify Manager in a cellular telephone network; and the user-password database system may be implemented by an Authentication Manager in a cellular telephone network. One or more of the various database systems may also be managed by a software application called Site Minder.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the various types of authentication that have been described could be used in connection with web-based applications running on a browser, such as Internet Explorer or Firefox. Also, the level of security that is provided may vary depending upon the particular network application that is accessed and/or the person or device that is accessing it.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The Abstract is provided to help the reader quickly ascertain the nature of the technical disclosure. It is submitted with the understanding that it will not be used to interpret or limit the scope or meaning of the claims. In addition, various features in the foregoing Detailed Description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

The invention claimed is:

1. A network authentication system for authenticating requests for services that are delivered from a network data communication device and that are directed to different applications, each request being directed to one of the applications comprising:
   a network communication interface configured to electronically receive the requests for services from the network data communication device and to electronically send requests for the services to the applications on behalf of the network data communication device, each received request including authentication information; and
   a data processing system configured to:
      electronically verify the authentication information included in each received request; and
      cause the network communication interface to send each request for the service indicated by the received request on behalf of the network data communication device to the application if and only if the authentication is successful, wherein the request for service sent to the application does not include the authentication information.

2. The network authentication system of claim 1 wherein each request for service that is sent by the network communication interface to an application is not configured to be authenticated by the application.

3. The network authentication system of claim 1 wherein the data processing system is configured to electronically verify the authentication information included in each received request by sending the authentication information to a security database system that is separate from the network authentication system and by receiving information from the security database system in response indicating whether the received request is authentic.

4. The network authentication system of claim 1 wherein the authentication information in each received request includes a session token.

5. The network authentication system of claim 4 wherein the data processing system is configured to electronically verify the authentication information received with each request by verifying the validity of the session token.

6. The network authentication system of claim 5 wherein the data processing system is configured to verify the validity of each session token by causing the network communication interface to send the session token to a token database system that is separate from the network authentication system and by receiving information from the token database system in response indicting whether the session token is valid.

7. The network authentication system of claim 1 wherein the data processing system is further configured to obtain the authentication information upon receiving an initial request for the services, to cause the network communication interface to send the authentication information to the network data communication device, and to verify that each subsequent request for the services from the network data communication device includes the authentication information.

8. The network authentication system of claim 7 wherein the data processing system is configured to cause the network communication interface to obtain the authentication information from a security database system that is separate from the network authentication system and to receive the authentication information from the security database system in response.

9. The network authentication system of claim 7 wherein the authentication information is a session token.

10. The network authentication system of claim 7 wherein the data processing system is configured to determine whether there are any additional application-specific security requirements in connection with the application to which each received request is directed, in addition to verifying the inclusion of the authentication information, and, if so, to verify that such application-specific security requirements are met in addition to verifying the inclusion of the authentication information.

11. The network authentication system of claim 1 wherein the network communication interface is configured to receive from the applications responses to the requests for services and the data processing system is configured to cause the network communication interface to deliver these responses to the network communication device.

12. The network authentication system of claim 1 wherein the network data communication device is a wireless mobile communication device.

13. The network authentication system of claim 1 wherein each of the applications is run on a different application server and the network communication interface is configured to send each request for service on behalf of the network communication device to the server on which the application is running.

14. Non-transitory, tangible, computer-readable storage media containing a program of instructions configured to cause a network authentication system running the program of instructions to authenticate requests for services that are delivered from a wireless mobile communication device and that are directed to different applications, each request being directed to one of the applications, by
   electronically receiving the requests for services from the network data communication device and to electronically send requests for the services to the applications on behalf of the network data communication device, each received request including authentication information;
   electronically verifying the authentication information included in each received request; and
   electronically sending each request for the service requested indicated by each received request on behalf of the network data communication device to the application if and only if the authentication is successful, wherein the request for service sent to the application does not include the authentication information.

15. The storage media of claim 14 wherein each request for service that is sent to an application is not configured to be authenticated by the application.

16. The storage media of claim 14 wherein each received request includes a session token, as the authentication information, from which the authenticity of the received request is determined.

17. The storage media of claim 14 wherein the program of instructions is configured to cause the network authentication system running the program of instructions to obtain a session token as the authentication information upon receiving an initial request for the services, to send the session token to the wireless mobile communication device, and to verify that each subsequent request for the services from the wireless mobile communication device includes the session token.

18. The storage media of claim 14 wherein the program of instructions is configured to cause the network authentication system running the program of instructions to receive from the applications responses to the requests for services and to deliver these responses to the wireless mobile communication device.

19. The storage media of claim 14 wherein each of the applications is run on a different application server and wherein the program of instructions is configured to cause the network authentication system running the program of instructions to send each request for service on behalf of the wireless mobile communication device to the server on which the application is running.

* * * * *